United States Patent Office 3,708,480
Patented Jan. 2, 1973

3,708,480
3-CYANOMETHYL-DELTA-3-CEPHALOSPORIN ANTIBIOTICS AND INTERMEDIATES
J. Alan Webber and Earle M. Van Heyningen, Indianapolis, Ind., assignors to Eli Lilly and Company, Indianapolis, Ind.
No Drawing. Continuation-in-part of applications Ser. No. 790,842, Jan. 13, 1969, and Ser. No. 802,643, Feb. 26, 1969, both being continuations-in-part of application Ser. No. 703,523, Feb. 7, 1968. This application Nov. 16, 1970, Ser. No. 90,085
Int. Cl. C07d 99/24
U.S. Cl. 260—243 C  7 Claims

ABSTRACT OF THE DISCLOSURE

Certain 3-cyanomethyl, 3-oxymethyl, and 3-thiomethyl ether $\Delta^3$-cephem-4-carboxylic acids, zwitterions, salts, and esters, e.g., p-methoxybenzyl 7-amino-3-cyanomethyl-$\Delta^3$-cephem-4-carboxylate, a nucleus ester, and 7-[D-$\alpha$-amino-$\alpha$-phenylacetamido]-3 - methoxymethyl-$\Delta^3$-cephem-4-carboxylic acid, and 7 - [D-$\alpha$-amino-$\alpha$-phenylacetamido]-3-methylthiomethyl-$\Delta^3$-cephem-4-carboxylic acid, new cephalosporin antibiotics.

CROSS-REFERENCE

This application is a continuation-in-part of our prior applications
(a) Ser. No. 790,842, filed Jan. 13, 1969, and
(b) Ser. No. 802,643, filed Feb. 26, 1969, each of which applications (a) and (b) being a continuation-in-part of our prior application Ser. No. 703,523, filed Feb. 7, 1968.

INTRODUCTION

This invention relates to $\Delta^3$-cephalosporin compounds, that is, to cephalosporin ester compounds having a carbon to carbon double bond between the carbon atoms in the 3 and 4 positions of the dihydrothiazine ring moiety of the cephalosporin compounds. More particularly, this invention provides a group of new 3-cyanomethyl- and some 3-oxymethyl and 3-thiomethyl ether-$\Delta^3$-cephem-4-carboxylic acids, zwitterions, salts and esters, which are useful generally as antibiotics or in the process route to antibiotically active $\Delta^3$-cephalosporanic acid derivatives. These compounds can now be readily prepared by the oxidation, reduction, cleavage, reacylation, and de-esterification of the $\Delta^2$-cephem products described in our prior application, Ser. No. 703,523, filed Feb. 7, 1968, and our application Ser. No. 790,886, filed January 13, 1970 both now abandoned.

BACKGROUND OF THE INVENTION

The semi-synthetic production of 7-acylamidodesacetoxycephalosporin antibiotics from penicillin starting materials has become of importance recently, due to the process invention of Morin and Jackson (U.S. Pat. 3,275,626) who describe and claim a process for converting penicillin sulfoxide esters to desacetoxycephalosporanic acid esters and to the improvements on that Morin-Jackson process by Chauvette and Flynn (U.S. application Ser. No. 574,311, filed Aug. 23, 1966) who found that certain esters of the penicillin starting materials and of the resulting desacetoxycephalosporin ester products were more useful in the process in that they were more easily cleaved than those employed by Morin and Jackson. Further improvements of the Morin-Jackson process were claimed by Robin D. G. Cooper (U.S. applications, Ser. No. 636,629, Ser. No. 636,593, and Ser. No. 636,592, all filed May 8, 1967, and now replaced by Cooper application Ser. No. 838,697, filed July 2, 1969, now U.S. Pat. No. 3,647,787) who found that the use of certain solvents directed the heat rearrangement of the penicillin sulfoxide esters more specifically toward production of the corresponding desacetoxycephalosporin esters and permitted the use of lower temperatures. Some of the 7-acylamidodesacetoxycephalosporanic acid compounds have been found to have unique properties as antibiotics in their own right. For example, cephalexin, 7-[D-$\alpha$-amino-phenylacetamido]-3-methyl-$\Delta^3$-cephem-4-carboxylic acid zwitterion and pharmaceutically acceptable cationic and anionic salt forms thereof are useful as oral antibiotics in combatting infections caused, e.g., by penicillin resistant strains of *Staphylococcus aureus*, and many other Gram-positive and Gram-negative microorganisms.

One of the unique advantages of $\Delta^3$-desacetoxycephalosporin compounds, that is, compounds of the general formula

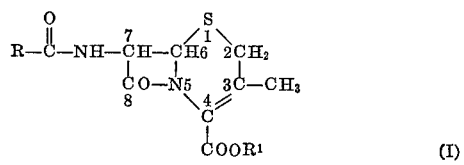

(I)

wherein R is the residue of the acylamido group in the 7-position and $R^1$ is hydrogen, a salt forming cation, an ester group, or an anionic charge when the COO— forms a salt with a cation either within or outside of the molecule, is that such compounds can now be prepared from penicillin sulfoxide esters by the Morin-Jackson process, especially as improved by the Chauvette-Flynn and R. D. G Cooper improvements.

In efforts to improve and expand the properties and utilities of these penicillin derived semi-synthetic cephalosporin substances, efforts have been expended on changing the 3-methyl group of the above $\Delta^3$-desacetoxycephalosporins to a group which gives the resulting cephalosporin compound enhanced antibiotic activity against one or more Gram-positive or Gram-negative microorganisms. However, to date at least, it has not been possible to convert directly a $\Delta^3$-desacetoxycephalosporin, to a 3-methyl functionalized $\Delta^3$-cephalosporin in any significant yield. In our prior application, Ser. No. 703,523, filed Feb. 7, 1968, now abandoned, but replaced in part by application Ser. No. 790,886, filed Jan. 13, 1969, now U.S. Pat. No. 3,637,678, we disclosed a method for converting $\Delta^2$-desacetoxycephalosporin ester compounds to 3-bromomethyl- and 3-(functionalized methyl)-$\Delta^2$-cephalosporin esters and the reason why it was necessary to do so in the preparation of some cephalosporins. It was there pointed out that 3-cyanomethyl- and the 3-oxymethyl-$\Delta^2$-cephem-4-carboxylate products of the process of that invention were useful as intermediates in the preparation of new and known $\Delta^3$-cephalosporin antibiotic compounds. Such $\Delta^2$-cephalosporin compounds can be converted to the corresponding $\Delta^3$-compounds by the oxidation of the $\Delta^2$-compound to the sulfoxide-$\Delta^3$-compound, and followed by reduction of the sulfoxide-$\Delta^3$-compound to the $\Delta^3$-cephalosporin compound by procedures disclosed therein. These processes are also described in Cooper application Ser. No. 764,939, filed Oct. 3, 1968, now U.S. Pat. No. 3,647,786, and in Murphy et al. application, Ser. No. 764,925, filed Oct. 3, 1968, now U.S. Patent No. 3,641,014.

When the desired 3-cyanomethyl- or 3-oxymethyl-$\Delta^3$-cephalosporin has been obtained as described above, any acyl group in the 7-position may be removed by known methods such as described in Chauvette's application, Ser. No. 651,662, filed July 7, 1967 now Pat. No. 3,549,628.

It is intended that the 7-acyl group in some of the 3-cyanomethyl- and 3-oxymethyl-ether $\Delta^3$-cephalosporin products of this invention can be removed by methods such as are described in Chauvette U.S. Pat. No. 3,549,628, or by the method described in U.S. application, Ser. No.

758,600, filed September 9, 1968, now U.S. Pat. No. 3,632,578, or other known methods, and then the resulting 7-amino-3-cyanomethyl- or 7-amino-3-oxymethyl ether-$\Delta^3$-cephem-4-carboxylate ester or the corresponding acid can be acylated with any desired acyl group. The ester group can be removed by known acid hydrolysis or hydrogenation procedures to yield the 7-amino-3-cyanomethyl- or 3-oxymethyl ether-$\Delta^3$-cephem-4-carboxylic acid nucleus as such, or as the zwitterion, or as a cationic or anionic salt form thereof. Similar ester group removal can be accomplished on the 7-acylamido compounds.

In U.S. Pats. 3,261,832 and 3,278,531 there are described a number of cephalosporin compounds substituted on the 3-methyl group with sulfur-containing nucleophiles. However, the compounds of 3,261,832 are said to have no practical antibiotic utility. They are useful only as intermediates in the preparation of cephalosporin antibiotics substituted on the 3-methyl with a pyridinium group. The sulfur-containing substituents of the compounds of 3,278,531 are rather complex and not readily obtainable, and many of the compounds may be administered only by injection. In fact, it is stated that they are particularly valuable for the formulation of injectable preparations.

It is an object of this invention to provide a group of new cephalosporin antibiotic derivatives having improved stability.

It is a more specific object of this invention to provide certain new 3-cyanomethyl- and 3-oxymethyl ether $\Delta^3$-cephalosporin compounds.

It is a further object of this invention to provide those in the cephalosporin antibiotic art with certain new 3-cyanomethyl- and 3-oxymethyl ether $\Delta^3$-cephalosporin antibiotics, and intermediate compounds leading thereto which were not available by previously known methods.

Other objects, aspects, and advantages of this invention will become apparent from the description and claims which follow.

DETAILED DESCRIPTION OF THE INVENTION

This invention provides compounds of the formula

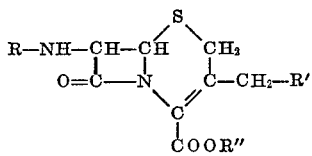

wherein R is selected from the group consisting of hydrogen

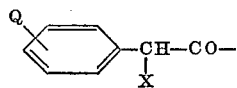

where X is amino, a protected amino, hydroxy, $C_1$ to $C_3$-alkyloxy, —COOH, or $C_1$ to $C_3$-alkanoyloxy,

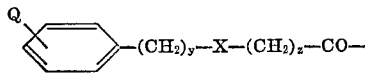

wherein X is oxygen or sulfur or a chemical bond, $y$ is an integer of from 0 to 2, and $z$ is 1 to 3,

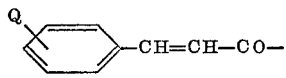

where Q in each of the above phenyl rings is hydrogen, $C_1$ to $C_3$-alkyl, $C_1$ to $C_3$-alkyloxy, cyano, nitro, hydroxy, chloro, bromo, fluoro, trifluoromethyl, $\alpha$-amino-$C_1$ to $C_3$-alkyl, carboxymethyl (HOOC—$CH_2$)—, or carboxamidomethyl ($H_2NC(O)CH_2$—),

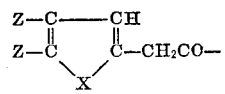

where X is oxygen or sulfur, and each Z separately denotes hydrogen, or taken together with the carbons to which they are bonded, complete a benzo- ring,

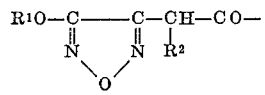

wherein each of $R^1$ and $R^2$ is
hydrogen or methyl,
1-sydnone-3-$C_1$ to $C_3$-alkanoyl-,
$C_1$ to $C_{10}$-alkanoyl-,
$C_3$ to $C_{10}$-alkenoyl,
$C_1$ to $C_7$-alkyl-X-$C_1$ to $C_3$-alkanoyl where X is oxygen or sulfur,
$C_2$ to $C_7$-alkenyl-X-$C_1$ to $C_3$-alkanoyl where X is oxygen or sulfur,
$C_2$ to $C_{10}$-haloalkanoyl where the halogen is fluorine, chlorine, or bromine, and $C_2$ to $C_{10}$-cyanoalkanoyl;

R' is cyano (—CN), —S—$CH_3$, or —OY where Y is
$C_1$ to $C_{10}$-alkyl
$C_3$ to $C_{10}$-alkenyl
$C_3$ to $C_{10}$-alkynyl
$C_2$ to $C_{10}$-haloalkyl,
$C_3$ to $C_{10}$-haloalkenyl, and
$C_3$ to $C_{10}$-haloalkynyl where halogen in each of such haloalkyl, haloalkenyl, and haloalkynyl groups is fluorine, chlorine, bromine, or iodine
$C_5$ to $C_7$-cycloalkyl,
$C_5$ to $C_7$-cycloalkyl-$C_1$ to $C_3$-alkyl-
$C_1$ to $C_3$-alkyl-X-$C_2$ to $C_6$-alkyl where X is oxygen or sulfur,
$C_2$ to $C_4$-alkanoyl-$C_1$ to $C_6$-alkyl,
$C_2$ to $C_4$-alkanoyloxy-$C_2$ to $C_6$-alkyl,
3'-furyl
(2'-furyl)-$C_3$-alkyl,
tetrahydrofuryl-$C_1$ to $C_2$-alkyl,
(2'-thienyl)-$C_1$ to $C_3$-alkyl
phenyl, benzyl, and phenylethyl, and
phenyl, benzyl, and phenylethyl
substituted on ring carbon atoms thereof with $C_1$ to $C_3$-alkyl, $C_1$ to $C_3$-alkyloxy, $C_1$ to $C_3$-alkyloxycarbonyl, fluorine, chlorine, bromine, nitro, cyano, or trifluoromethyl, or combinations thereof; and R" is selected from the group consisting of
hydrogen, a zwitterionic charge, or a salt with a pharmaceutically acceptable cation or anion, and
$C_4$ to $C_6$-tert-alkyl, such as tert-butyl, tert-pentyl, and tert-hexyl,
$C_5$ to $C_7$-tert-alkenyl, such as tert-pentenyl, tert-hexenyl, and tert-heptenyl,
$C_5$ to $C_7$-tert-alkynyl, such as tert-pentynyl, tert-hexynyl, and tert-heptynyl,
benzyl,
methoxybenzyl,
nitrobenzyl,
benzhydryl,
phthalimidomethyl,
succinimidomethyl,
trimethylsilyl, and
phenacyl ester groups Certain of the above included 7-acylamido-3-cyanomethyl- and 3-oxymethyl ether-$\Delta^3$-cephem-4-carboxylate esters are prepared by oxidizing the corresponding $\Delta^2$-compound to the $\Delta^3$-sulfoxide, and then reducing the $\Delta^3$-sulfoxide to the $\Delta^3$-cephalosporin ester compound. For example, p-methoxybenzyl 7-phenoxyacetamido-3-cyanomethyl-$\Delta^3$-cephem-4-carboxylate is prepared by oxidizing p-methoxybenzyl 7-phenoxyacetamido-3-cyanomethyl-$\Delta^2$-cephem-4-carboxylate to the corresponding 1-oxide (sulfoxide) e.g., with m-chloroperbenzoic acid in an appropriate solvent, and reducing the sulfoxide with sodium dithionite or equivalent reducing agents in the presence of acetyl chloride.

The 7-amino-3-cyanomethyl- and 3-oxymethyl ether-$\Delta^3$-cephem-4-carboxylate esters, referred to as nuclei type compounds, are prepared by cleaving the 7-acyl group or other 7-amino-blocking group which was present during the above described oxidation and reduction steps. For example, p-nitrobenzyl 7-amino-3-ethoxymethyl-$\Delta^3$-cephem-4-carboxylate is obtained by reacting p-nitrobenzyl 7-phenoxyacetamido-3-ethoxymethyl-$\Delta^3$-cephem-4-carboxylate with $PCl_5$ in the presence of a tertiary amine, followed by treatment with an alkanol such as methanol, and then with water to effect cleavage.

The remaining 7-acylamido-3-cyanomethyl- and 3-oxymethyl ether $\Delta^3$-cephem-4-carboxylate compounds are prepared by acylating the 7-amino-3-cyanomethyl or 3-oxymethyl ether $\Delta^3$-compounds, either in the ester or acid form with the desired acyl group according to known cephalosporin acylation procedures.

The 7-amino-3-cyanomethyl- and 3-oxymethyl ether $\Delta^3$-cephem-4-carboxylic acids and the 7-acylamido-3-cyanomethyl- and 3-oxymethyl ether-$\Delta^3$-cephem-4-carboxylic acids are prepared by de-esterifying the esters by known methods or by methods described in the above cited applications, either before or after the 7-amino group is re-acylated.

Our novel 3-thiomethyl ether compounds can be prepared by the acylation of 3-methylthiomethyl-7-amino-$\Delta^3$-cephen-4-carboxylic acid with phenylglycine, thienylglycine, or an appropriately substituted phenylglycine. Throughout this specification reference to phenylglycine is meant to include thienylglycine and such substituted phenylglycines. It is understood that the α-amino group of phenylglycine is protected during the acylation step with any known protecting group commonly used in protecting amino groups in amino acid or peptide chemistry. A few examples of such protecting groups are t-butoxycarbonyl, benzyloxycarbonyl and 2,2,2-trichloroethoxycarbonyl. At the completion of the acylation step these groups are removable by treatment with an acid such as p-toluenesulfonic acid or by reductive cleavage. For the acylation the protected phenylglycine may be activated with a carbodiimide or used as the acid chloride or bromide, or a mixed anhydride, especially with a lower alkyl carbonic acid. Acylation procedures are well known to those skilled in the art.

The 3 - methylthiomethyl-7-amino-$\Delta^3$-cephem-4-carboxylic acid to be acylated may be prepared by any known method. For example, this acid can be prepared by treating 7-aminocephalosporanic acid with methyl mercaptan or treating 3-acetoxymethyl - 7 - phenyl-acetamido-$\Delta^3$-cephem-4-carboxylic acid or the corresponding 7-phenoxyacetamido acid with methyl mercaptan, protecting the carboxyl group by ester formation, and then cleaving the phenylacetyl or phenoxyacetyl group by reaction with phosphorous pentachloride in the presence of a tertiary amine followed by treatment with a lower alkanol, then with water or aqueous acid to form the 3-methylthiomethyl-7-amino-$\Delta^3$-cephem-4-carboxylic acid ester. After acylation with the phenylglycine the ester group may be removed to regenerate the free carboxylic acid.

Our novel compounds can also be prepared from a penicillin starting material such as penicillin V by a multistep process starting with the process described in Morin and Jackson U.S. Pat. 3,275,626 for the conversion of a penicillin sulfoxide ester to a desacetoxycephalosporanic acid ester. This $\Delta^3$-desacetoxycephaloporin ester is then isomerized to a $\Delta^2$-cephalosporin which can be converted to the corresponding 3-bromomethyl derivative by treatment with N-bromosuccinimide. Treatment of this 3-bromomethyl compound with methyl mercaptan results in the formation of the corresponding 3-methylthiomethyl compound. The double bond in the 2-position can then be isomerized to the 3-position by base isomerization. The acyl group in the 7-position can be removed as described above to yield the 3-methylthiomethyl-7-amino-$\Delta^3$-cephem-4-carboxylic acid or ester. Acylation of this 7-amino compound with phenylglycine yields the desired acid or ester.

The amino protecting or blocking group represented by R in the above formula may be, e.g., triphenylmethyl (trityl), trimethylsilyl, or any other amino protecting group such as tert-butoxycarbonyl or benzyloxycarbonyl, but most practically, and preferably, it is an acyl group. Many acyl groups suitable as intermediates for the purpose of preparing compounds of this invention are already known in the penicillin and cephalosporin art. In the first steps of preparing compounds of this invention, R is preferably a phenylacetyl, phenoxyacetyl, phenylmercaptoacetyl, or other acyl group that occurs in penicillins available by biosynthesis as described in the applications cited above. This acyl group is thus one that is economical, stable to the various chemical reactions to which the molecule is subjected in the intermediate steps, but which is readily cleaved by the procedures defined above at the desired stage in the preparation of the cephalosporin antibiotics of this invention. Preferably, it is derived from the penicillin that was used several steps prior for conversion to a cephalosporin material.

To place the preparation of the new compounds of this invention in perspective relative to earlier discoveries in the conversion of penicillins to cephalosporin compounds a summary of steps is given, using phenoxymethyl penicillin (penicillin V) as an example.

(1) Phenoxymethylpenicillin is converted to the sulfoxide and esterified with an ester group which can be easily removed by acid hydrolysis methods or hydrogenation methods later in the process. Alternatively, the penicillin can be esterified first and converted to the pencillin sulfoxide thereafter;

(2) The phenoxymethylpenicillin sulfoxide ester is heat treated according to the Morin-Jackson process referred to above as improved by the Cooper improvements to form the corresponding $\Delta^3$-cephalosporin ester, 7-phenoxyacetamido-3-desacetoxy-$\Delta^3$-cephem-4-carboxylate; the $\Delta^3$-cephalosporin ester is hydrolyzed to the corresponding acid by basic hydrolysis to the $\Delta^2$-acid which is subsequently converted into the acid chloride and $\Delta^2$-cephalosporin ester, by the Murphy method described in U.S. application Ser. No. 759,490, filed Sept. 12, 1968, now abandoned, but replaced with application Ser. No. 151,555, filed June 9, 1971.

(3) The $\Delta^3$-cephalosporin ester is treated according to our described procedure referred to above to form the corresponding 7-phenoxyacetamido - 3 - bromomethyl-$\Delta^2$-cephem-4-carboxylate ester, and then with the appropriate nucleophilic reagent, e.g., methanol to form, e.g., p-methoxybenzyl 7-phenoxyacetamido-3-methoxymethyl-$\Delta^2$-cephem-4-carboxylate as product.

(4) The product of step (3) is then oxidized in a suitable solvent with m-chloroperbenzoic acid, or other oxidizing agent, to form the p-methoxybenzyl 7-phenoxyacetamido-3-methoxymethyl - $\Delta^3$ - cephem-4-carboxylate-1-oxide (the sulfoxide);

(5) The sulfoxide is thereafter treated with an appropriate reducing agent such as sodium dithionite in the presence of an acyl halide such as acetyl chloride to form the first product of this invention, p-methoxybenzyl 7-phenoxyacetamido-3-methoxymethyl - $\Delta^3$ - cephem-4-carboxylate. This new product is useful as an intermediate as described in the steps which follow for the preparation of a valuable new cephalosporin antibiotic.

(6) The product from step (5) can be de-esterified by known methods to produce 7-phenoxyacetamido-3-methoxymethyl-$\Delta^3$-cephem-4-carboxylic acid, an antibiotic. We prefer, however, to cleave the 7-acyl group from the ester by treating the ester first with $PCl_5$ in the presence of pyridine, then with methanol, and then with water to form the p-methoxybenzyl 7-amino-3-methoxymethyl-$\Delta^3$-cephem-4-carboxylate ester nucleus, as such, or preferably as the salt of a $C_6$ to $C_{12}$ aromatic hydrocarbon sulfonic acid, such as the p-toluenesulfonate (tosylate) salt, (7) The new ester nucleus or its tosylate salt from step (6) can then be de-esterified to obtain the nucleus acid zwitterion, but the nucleus ester is preferably re-acylated with any of a variety of desired acylating agents, containing one of the acyl groups set forth above, e.g., with an isobutyl or sec-butyl mixed anhydride form of D-α-(blocked amino)-α-phenylacetic acid to form the p-methoxybenzyl 7-[D-α-(blocked amino) - α - phenylacetamido]-3-methoxymethyl-Δ³-cephem-4-carboxylate ester. A suitable blocking group is tert-butoxycarbonyl, benzyloxycarbonyl, or the enamine formed with methyl acetoacetate.

(8) The ester from step (7) is treated by known methods to remove the amino blocking and p-methoxybenzyl ester groups to obtain 7-(D-α-amino-α-phenylacetamido)-3-methoxymethyl-Δ³-cephem-4-carboxylic acid, as such, or in the zwitterionic or pharmaceutically acceptable salt form such as the sodium, potassium, cationic salts, or as anionic salts with suitable strong acids having a pKa of less than 4 such as hydrochloric, hydrobromic, sulfuric or like acids.

Examples of nucleus-type compounds of this invention which can be made by the general procedure described above include:

7-amino-3-cyanomethyl-Δ³-cephem-4-carboxylic acid,
7-amino-3-n-hexyloxymethyl-Δ³-cephem-4-carboxylic acid,
7-amino-3-allyloxymethyl-Δ³-cephem-4-carboxylic acid,
7-amino-3-(1-methyl-3-butynyloxymethyl)-Δ³-cephem-4-carboxylic acid,
7-amino-3-(cyclohexyloxymethyl)-Δ³-cephem-4-carboxylic acid,
7-amino-3-(cyclopentylmethyloxymethyl)-Δ³-cephem-4-carboxylic acid,
7-amino-3-(3-bromopropyloxymethyl)-Δ³-cephem-4-carboxylic acid,
7-amino-3-(2-phenylethoxymethyl)-Δ³-cephem-4-carboxylic acid,
7-amino-3-phenoxymethyl-Δ³-cephem-4-carboxylic acid,
7-amino-3-methylthiomethyl-Δ³-cephem-4-carboxylic acid,
7-amino-3-(4'-nitrophenoxymethyl)-Δ³-cephem-4-carboxylic acid,
7-amino-3-(ethylthioethoxymethyl)-Δ³-cephem-4-carboxylic acid,
7-amino-3-(propionyloxymethoxymethyl)-Δ³-cephem-4-carboxylic acid,
7-amino-3-(butanoylpropoxymethyl)-Δ³-cephem-4-carboxylic acid,
7-amino-3-(pentyloxycarbonylethoxymethyl)-Δ³-cephem-4-carboxylic acid,
7-amino - 3 - (2'-thienylethoxymethyl)-Δ³-cephem-4-carboxylic acid, as zwitterions or in the ester forms with an easily removable ester group.

Examples of 7-acylamido-3-cyanomethyl- and 3-oxymethyl ether Δ³-cephem-4-carboxylic acid compounds of this invention, which can be prepared by acylating nuclei of the above types by known methods include:

7-(D-α-amino-α-phenylacetamido)-3-cyanomethyl-Δ³-cephem-4-carboxylic acid,
7-(D-α-amino-α-(2'-thienyl)acetamido)-3-methoxymethyl-Δ³-cephem-4-carboxylic acid,
7-(2'-sydnone-3'-acetamido)-3-tert-butoxymethyl-Δ³-cephem-4-carboxylic acid,
7-(α-carboxy-α-phenylacetamido)-3-methoxymethyl-Δ³-cephem-4-carboxylic acid,
7-octanoylamido-3-allyloxymethyl-Δ³-cephem-4-carboxylic acid,
7-(2'-heptenoylamido)-3-propynyloxymethyl-Δ³-cephem-4-carboxylic acid,
7-α-amino-α-thienylacetamido)-3-methylthiomethyl-Δ³-cephem-4-carboxylic acid,
7-hexylthioacetamido-3-cyclopentyloxymethyl-Δ³-cephem-4-carboxylic acid,
7-(2-butenyloxyacetamido)-3-isopropoxymethyl-Δ³-cephem-4-carboxylic acid,
7-(3'-hydroxyphenylacetamido)-3-ethoxymethyl-Δ³-cephem-4-carboxylic acid,
7-(4'-bromophenoxyacetamido)-3-(2'-phenylethoxymethyl)-Δ³-cephem-4-carboxylic acid, 7 - [β-(3'-chlorophenyl)propenoylamido]-3-cyanomethyl-Δ³-cephem-4-carboxylic acid, and esters of such compounds with ester groups removable with trifluoroacetic acid, acetic or formic acids, by dilute hydrochloric or sulfuric acid, or by hydrogenation in the presence of a palladium on carbon, barium sulfate, or alumina carrier with or without acid. The preferred ester groups for this purpose are those listed above.

Although the new compounds of this invention can be generally classed as Δ³-cephalosporin compounds, specific starting materials, intermediates, and products are often named herein, for convenience, by use of the "cephem" nomenclature system. "Penam" nomenclature for the penicillins is described by Sheehan, Henery-Logan, and Johnson in the Journal of the American Chemical Society (JACS), 75, 3292, footnote 2 (1953), and has been adapted to the cephalosporins by Morin, Jackson, Flynn, and Roesko [JACS, 84 3400 (1962)]. In accordance with these systems of nomenclature "penam" and "cepham" refer, respectively, to the following saturated ring systems:

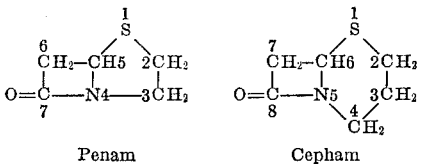

Penam          Cepham

"Cephem" refers to the cepham ring structure containing a double bond, the position of which is indicated by a prefixed "Δ" with a superscript integer denoting the lowest numbered atom to which the double bond is connected, or by the word "delta" with the same number relationship. Sometimes, the position of the double bond in the "cephem" is indicated by the number alone without using the "Δ" or "delta" terms. Thus, for example, penicillin V, 6-phenoxymethylpenicillin can be named 6-phenoxyacetamido-2,2-dimethyl-penam - 3 - carboxylic acid, and a suitable cephalosporin starting material for preparing compounds of this invention can be named 4-nitrobenzyl 7-phenoxyacetamido-3-methoxymethyl-Δ²-cephem-4-carboxylate. Similarly, a cephalosporin antibiotic of this invention can be named sodium 7-(2'-thienylacetamido)-3-cyanomethyl-Δ³-cephem - 4 - carboxylate salt.

An oxidation procedure for converting 3-nucleophile-methyl-Δ²-cephem products to sulfoxides is disclosed in United States patent application, Serial No. 764,939, filed October 3, 1968. A procedure for reducing cephalosporin sulfoxides is described in United States Patent No. 3,641,014.

The invention is further illustrated by the following detailed examples which are intended to be illustrative only, and not as limiting the scope of new compounds of this invention.

EXAMPLE 1 t-Butyl 7-amino-3-cyanomethyl-Δ³-cephem-4-carboxylate p-toluenesulfonate

To a solution of 2.15 gm. (5 mM) t-butyl 7-phenoxyacetamido-3-cyanomethyl - Δ³ - cephem-4-carboxylate in 100 cc. dry benzene was added (590 mg. 1.5 eq.) dry pyridine and (1.56 gm., 1.5 eq.) phosphorus pentachloride. This mixture was heated under $N_2$ for two hours at 56° C. The benzene was removed and 100 cc. of ice-cold methanol was added. After standing at room temperature overnight, the methanol was removed under reduced pressure, 75 cc. THF added, and, after cooling, 75 cc. cold pH 4.5 buffer solution. After standing 20 minutes, the THF was removed under reduced pressure and ethyl acetate and some water was added. The pH of this mixture was adjusted to 6.5 with sodium bicarbonate. The organic layer was separated, washed twice and NaCl solution, dried over $MgSO_4$, filtered and evaporated to a small volume. To a solution of this tert.-butyl 7-amino-3-cyanomethyl-$\Delta^3$-cephem-4-carboxylate in 50 cc. ethyl acetate was added a solution of 951 mg. of p-toluenesulfonic acid in 50 cc. ethyl acetate. The p-toluenesulfonate salt was allowed to crystallize overnight and then collected by suction filtration, 856 mg., M.P. 177° C. (d). The structure was confirmed by I.R., U.V., N.M.R., and elemental analysis.

EXAMPLE 2 t-Butyl 7-amino-3-methoxymethyl-$\Delta^3$-cephem-4-carboxylate p-toluenesulfonate To a solution of 364 mg. (0.84 mM) of oily tert-butyl 7 - phenoxyacetamido-3-methoxymethyl-$\Delta^3$-cephem-4-carboxylate dissolved in 30 cc. dry benzene was added 83 mg. dry pyridine and 218 mg. phosphorus pentachloride (1.25 eq.). The mixture was heated for 2 hours under $M_2$ at 56-58° C. The benzene was removed and 35 cc. of ice-cold methanol added. This solution was allowed to stand for 24 hours at room temperature. The methanol was removed under reduced pressure and 20 cc. THF added. After cooling, 20 cc. pH 4.5 buffer was added, and the mixture allowed to stand 20 minutes at room temperature. After removing the THF under reduced pressure, dilute NaCl solution and ethyl acetate were added, and the pH adjusted to 6.5 with solid $NaHCO_3$. The organic layer was removed, washed twice with saturated NaCl solution, dried over $MgSO_4$, filtered, and evaporated to a small volume. To a solution of this tert-butyl 7-amino-3-methoxymethyl-$\Delta^3$-cephem-4-carboxylate in 20 cc. ethyl acetate was added a solution of 160 mg. p-toluenesulfonic acid monohydrate. The p-toluenesulfonate salt of tert-butyl 7-amino-3-methoxymethyl - $\Delta^3$ - cephem - 4 - carboxylate crystallized spontaneously giving 177 mg. (45 percent yield). This solid salt was recrystallized from isopropyl alcohol to give a more pure sample, M.P. 183–187° C. whose structure was confirmed by I.R., U.V., N.M.R., and elemental analysis.

EXAMPLE 3 t-Butyl 7-(2'-thienylacetamide)-3-cyanomethyl-$\Delta^3$-cephem-4-carboxylate

To a cooled mixture of 467.5 mg. (1 mM) of t-butyl 7-amino-3-cyanomethyl - $\Delta^3$ - cephem - 4 - carboxylate p-toluenesulfonate, (420 mg., 5 mM) solid $NaHCO_3$, and (30 cc.) dry acetone was added 48 mg. (3 mM) of distilled thiophene-2-acetyl chloride in 10 cc. dry acetone. The reaction mixture was stirred one hour in the cold (0°-5° C.) and 3 hours at room temperature. The acetone was removed under reduced pressure and benzene added. This mixture was washed successively with sodium bicarbonate solution, cold 5 percent HCl solution, five times with $NaHCl_3$ solution, then a NaCl solution, dried over $MgSO_4$, filtered and evaporated to give 481 mg. of product. This product was crystallized from carbon tetrachloride to give 271 mg. (66 percent), of tert-butyl 7-(2'thienyl)acetamido - 3 - cyanomethyl - $\Delta^3$ - cephem-4-carboxylate, M.P. 164–166° C. The structure was confirmed by I.R., U.V., N.M.R. and elemental analysis.

EXAMPLE 4

7-(2'-Thienyl)acetamido-3-cyanomethyl-$\Delta^3$-cephem-4-carboxylic acid

A solution of 455 mg. t-butyl 7-thiopheneacetamido-3-cyanomethyl-$\Delta^3$-cephem-4-carboxylate in 40 cc. of 98–100 percent formic acid was stirred under $N_2$ at room temperature for 2½ hours. The formic acid was removed under reduced pressure. Ethyl acetate and water were added and the pH was adjusted to about 7.5 with sodium bicarbonate. To the aqueous layer was added ethyl acetate, the mixture cooled, and acidified to pH 2.8 with 20 percent HCl. The organic layer was removed, washed twice with saturated NaCl solution, dried over $MgSO_4$, filtered, and evaporated to give 234 mg. of a golden foam.

This foam material was taken up in boiling ethyl ether (10 mg. insoluble). After evaporation to a small volume, the desired acid 7-(2'-thienyl)acetamido-3-cyanomethyl-$\Delta^3$-cephem-4-carboxylic acid, crystallized, 97 mg., M.P. 114–117° C. The structure was confirmed by I.R., U.V., and N.M.R. It gave an active antibiotic zone on a bioautograph of a paper chromatogram which was slightly faster moving than sodium cephalothin.

EXAMPLE 5 p-Methoxybenzyl 7-amino-3-methoxymethyl-$\Delta^3$-cephem-4-carboxylate p-toluenesulfonate salt To a solution of 996 mg. (2 mM) of p-methoxybenzyl 7 - phenoxyacetamido-3-methoxymethyl - $\Delta^3$ - cephem-4-carboxylate and 221.5 mg. dry pyridine (1.4 eq.) in 75 cc. dry benzene was added 601 mg. (40 percent excess) of phosphorus pentachloride. The mixture was heated under $N_2$ for two hours at 50° C. The benzene was removed by evaporation under reduced pressure and 100 cc. of ice-cold methanol was added. After standing at room temperature overnight the methanol was removed by evaporation under reduced pressure. To the residue was added 40 cc. THF, and, after cooling, 40 cc. water was added. This homogeneous mixture was allowed to stand 25 minutes; THF was removed under reduced pressure, ethyl acetate and some water added, and the pH adjusted to 6.5 with solid $NaHCO_3$. The organic layer was removed, washed twice with saturated NaCl solution, dried with $MgSO_4$, filtered, and evaporated to a small volume. To a solution of the crude p-methoxybenzyl 7-amino-3-methoxymethyl-$\Delta^3$-cephem-4-carboxylate obtained therefrom in a total of 80 cc. of ethyl acetate was added a solution of 380 mg. (2 mM) p-toluenesulfonic acid monohydrate in 10 cc. ethyl acetate. The p-toluenesulfonate salt began to crystallize within a few minutes. After 3 hours, the crystals were collected by suction filtration: 781 mg. (75 percent), M.P. 160–164° C., structure confirmed by I.R., U.V., N.M.R., and elemental analysis.

EXAMPLE 6 tert-Butyl 7-(2'-sydnone-3-acetamido)-3-methoxymethyl-$\Delta^3$-cephem-4-carboxylate

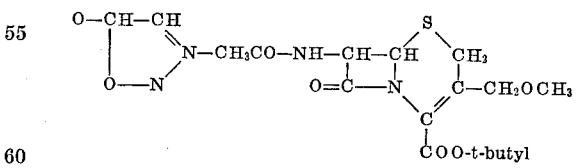

The tosylate salt of tert-butyl 7-amino-3-methoxymethyl-$\Delta^3$-cephen-4-carboxylate (236 mg., 0.5 millimole) was stirred in a water/ethyl acetate mixture. The pH was adjusted to 7 with $Na_2HPO_3$. The ethyl acetate layer was shaken with saturated sodium chloride solution, dried with magnesium sulfate, and then evaporated. The residue was dissolved in 10 ml. of tetrahydrofuran (THF) and added to the tert-butyl mixed anhydride of 2-sydnone-3-acetic acid prepared at —5° C. by adding 50 mg. (0.07 ml.) of triethylamine and 0.06 ml. of pivaloyl chloride to 80 mg. of 2-sydnone-3-acetic acid in 10 ml. of dry tetrahydrofuran. After stirring in an ice bath for one hour and for two hours at room temperature, the reaction mixture was diluted with 100 ml. of water and extracted with ethyl acetate. The ethyl acetate solution was shaken with pH 8 phosphate buffer, dried with magnesium sulfate, and concentrated. The residue was slurried with ethyl ether, collected, washed with ether and vacuum dried, yielding 95 mg. of the above named ester. A nuclear magnetic resonance (NMR) analysis confirmed the structure.

EXAMPLE 7

7-(2'-sydnone-3'-acetamido)-3-methoxymethyl-$\Delta^3$-cephem-4-carboxylic acid

An 86 mg. portion of the tert-butyl 7-(2'-sydnone-3-acetamido)-3-methoxymethyl-$\Delta^3$-cephem - 4 - carboxylate was dissolved in 2 ml. of 98 percent formic acid and stirred at room temperature for two hours. The solution was evaporated to dryness. The semi-solid residue which resulted was triturated with ethyl ether and the solid was then collected and vacuum dried, yielding 52 mg. of 7-(2'-sydnone - 3' - acetamido) - 3 - methoxymethyl - $\Delta^3$-cephem-4-carboxylic acid. Elemental microanalysis and ultraviolet (U.V.) analysis data were consistent with this structure.

EXAMPLE 8 tert-Butyl 7-(2'-carboxy-2'-phenylacetamido)-3-methoxymethyl-$\Delta^3$-cephem-4-carboxylate A solution of 328 mg. (1.4 mmoles) of the mono-tert-butyl ester of phenylmalonic acid and 0.21 ml. (156 mg., 1.54 mmoles) of triethylamine in 30 ml. of THF was cooled to —5° C. and 168 mg. (0.168 ml., 14 mmoles) of pivaloyl chloride was added to form the tert-butyl mixed anhydride. After 20 minutes, a solution of 342 mg. (1.4 mmoles) of 7-amino-3-methoxymethyl-$\Delta^3$-cephem-4-carboxylic acid (7-AMCA) prepared by hydrolysing the tert-butyl 7-amino-3-methoxymethyl-$\Delta^3$-cephem - 4 - carboxylate ester in formic acid, in a mixture of 10 ml. of water-10 ml. of THF, containing an equivalent amount of triethylamine was added to the mixed anhydride solution. After stirring the mixture for 1 hour in the cold (0°–5° C.) and 2 hours at room temperature, the reaction solution was cooled, overlayered with ethyl acetate, and the pH was adjusted to 2.0 with 6 N HCl. The ethyl acetate solution was dried and concentrated. The residue was taken up in ethyl ether, then re-precipitated with a commercially available petroleum hydrocarbon fraction, mostly hexane (B.P. 60–68° C.), yielding 88.0 mg. of the tert-butyl 7-(2'-carboxy-2'-phenylacetamido)-3-methoxymethyl-$\Delta^3$-cephem-4-carboxylate.

EXAMPLE 9

The tert - butyl 7-(2'-carboxy-2'-phenylacetamido)-3-methoxymethyl-$\Delta^3$-cephem-4-carboxylate ester from Example 8 was stirred in one ml. of cold trifluoroacetic acid. After 15 minutes the solution was evaporated. The residue was stirred in 5 ml. of a 1:1 v./v. mixture of petroleum hydrocarbon (B.P. 60–68° C.): ethyl ether for 1 hour, and then collected and vacuum dried, yielding 56.1 mg. of 7-(2'-carboxy - 2' - phenylacetamido)-3-methoxymethyl-$\Delta^3$-cephem-4-carboxylic acid. The elemental analyses and UV spectrum were consistent with this structure.

EXAMPLES 10 TO 16

A mixture of 268 mg. (0.5 mmole) of the tosylate salt of p-methoxybenzyl 7-amino-3-methoxymethyl-3-cephem-4-carboxylate and 336 mg. (2.0 mmoles) of sodium bicarbonate was stirred in 25 ml. of acetone while cooling the reaction mixture in an ice-bath. After adding 130 mg. (0.62 mmole) of 2-benzothienylacetyl chloride, the reaction mixture was stirred for one hour in the cold, followed by a further two hours at room temperature. The reaction solution was then diluted with 100 ml. of $H_2O$. The precipitated solid was collected, washed with water and vacuum dried at 45°, yielding 250.0 mg. (93 percent), M.P. 182–5° C. The NMR spectrum and microanalysis confirmed the structure of this compound. It was shown by thin layer chromatography (TLC) to contain only one product, p-methoxybenzyl 7-(2'-benzothienylacetamide)-3-methoxymethyl-$\Delta^3$-cephem-4-carboxylate. A summary of analytical data from this and other new compounds prepared as described above is given below:

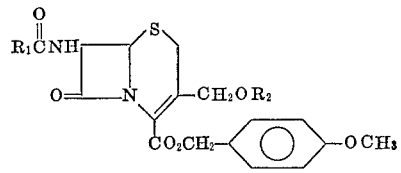

| Example | R₁ | R₂ | M.P., °C. | Calcd. C | Calcd. H | Calcd. N | Found C | Found H | Found N |
|---|---|---|---|---|---|---|---|---|---|
| 10 | 2-benzothienylmethyl | CH₃ | 182–5 | 60.22 | 4.87 | 5.20 | 60.02 | 4.97 | 5.19 |
| 11 | 4-nitrobenzyl | CH₃ | 201–5 | 56.92 | 4.78 | 7.97 | 56.92 | 4.83 | 8.05 |
| 12 | 3-chlorobenzyl | CH₃ | 171–4 | 58.07 | 4.87 | 5.42 | 57.82 | 4.91 | 5.36 |
| 13 | 3-chlorophenylthiomethyl | CH₃ | 138–143 | 54.68 | 4.59 | 5.10 | 54.84 | 4.81 | 5.32 |
| 14 | (4-methoxy-1,2,5-oxadiazolyl-3) methyl | CH₃ | 158–165 | 52.38 | 4.80 | 11.11 | 50.35 | 5.04 | 10.00 |
| 15 | α-Formyloxy-α-phenylmethyl | CH₃ | 149–150 | 59.77 | 4.24 | 5.36 | 59.70 | 4.06 | 5.19 |
| 16 | 2-thienylmethyl | —C₂H₅ | 159–162 | 57.37 | 5.22 | 5.58 | 57.64 | 5.33 | 5.35 |

EXAMPLES 17 to 23

A solution of 120 mg. (0.23 millimole) of p-methoxybenzyl 7-(4'-nitrophenylacetamido)-3-methoxymethyl-$\Delta^3$-cephem-4-carboxylate, 0.4 ml. of trifluoroacetic acid and 20 drops of anisole in 10 ml. of benzene was allowed to stand at room temperature for 1.5 hours. The reaction solution was then added to 100 ml. of pH 7 buffer. After separation of layers, the aqueous layer was overlayered with ethyl acetate and the pH was adjusted to 1.5 with 6 N HCl. The ethyl acetate layer was washed with water and with saturated HaCl solution, dried (HgSO₄) and concentrated. The residue was dissolved in 15 ml. of ethanol and 0.4 ml. of a 1 N solution of sodium acetate in methanol was added. After two hours at 0°, the solid was collected, washed with ethanol and dried in vacuum at 45°, yielding 76 mg. (85 percent) of crystalline product 7 - (4' - nitrophenylacetamido)-3-methoxy-methyl-$\Delta^\ominus$-cephem-4-carboxylic acid, sodium salt. The NMR and UV spectra confirmed the structure of this compound. The microanalysis was also in agreement with calculated values. A summary of the physical chemical data obtained from this and other salts of the formula below is given:

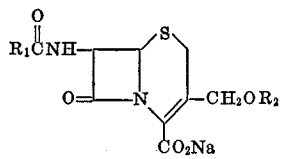

| Example | R₁ | R₃ | Calcd. | | | Found | | | UV | |
|---|---|---|---|---|---|---|---|---|---|---|
| | | | C | H | N | C | H | N | λ | ε |
| 17 | 4-nitrobenzyl | CH₃ | 47.54 | 3.75 | 9.78 | 47.70 | 4.15 | 9.51 | 217<br>265 | (10,800)<br>(16,300) |
| 18 | 2-benzothienylmethyl | CH₃ | 51.81 | 3.89 | 6.36 | 51.91 | 3.73 | 6.30 | 227<br>258<br>297 | (17,000)<br>(9,550)<br>(2,000) |
| 19 | 3-chlorobenzyl | CH₃ | 49.08 | 4.76 | 6.02 | 48.91 | 4.69 | 5.73 | 258 | (7,000) |
| 20 | 3-chlorophenylmercaptomethyl | CH₃ | 45.28 | 3.57 | 6.21 | 44.99 | 3.78 | 5.92 | 252 | (12,300) |
| 21 | (4-methoxy-1,2,5-oxadiazolyl-3)methyl | CH₃ | 41.37 | 3.72 | 13.79 | 41.40 | 4.01 | 13.50 | | |
| 22 | (D-α-hydroxyl-α-phenyl)methyl | CH₃ | 50.99 | 4.28 | 7.00 | 45.56 | 4.76 | 6.37 | 258 | (6,800) |
| 23 | 2-thienylmethyl | —C₂H₅ | 57.37 | 5.22 | 5.58 | 57.64 | 5.33 | 5.35 | | |
| | do | CH₃ ᵃ | 48.89 | 4.37 | 7.60 | 48.60 | 4.50 | 7.63 | | |

ᵃ The last compound in this table was analyzed as the free acid.

The above new cephalosporins gave characteristic R_f values in paper chromatography and were tested in in vitro microbiological assays wherein all compounds demonstrated excellent activity against several strains of staphylococci. The derivatives after oral administration effectively protected mice from death by streptococcal infections.

EXAMPLE 24

7-Amino-3-methoxymethyl-Δ³-cephem-4-carboxylic acid

To a 268 mg. (1 millimole) portion of the p-toluenesulfonate salt of p-methoxybenzyl 7-amino-3-methoxymethyl-Δ³-cephem-4-carboxylate, stirred in water, there was added disodium orthophosphate to pH 7 while overlaying the solution with ethyl acetate. The ethyl acetate solution was dried over magnesium sulfate and evaporated to dryness. The oily residue was dissolved in 25 ml. of benzene containing 40 drops of anisole and 0.8 ml. of trifluoroacetic acid. After stirring the mixture for 2 hours at room temperature, the benzene was evaporated and the residue was taken up in 10 ml. of water overlayered with 10 ml. of ethyl acetate. The pH was adjusted to 3.6 by the addition of triethylamine. After refrigerating the mixture overnight, the solid was collected, washed with water and ethyl acetate and vacuum dried at 45° C. yielding 75 mg. of 7-amino-3-methoxymethyl-Δ³-cephem-4-carboxylic acid. The structure was confirmed by infrared (IR), ultraviolet (UV), and NMR spectra.

A similar procedure was used to prepare 7-amino-3-ethoxymethyl-Δ³-cephem-4-carboxylic acid from its p-methoxybenzyl ester.

EXAMPLE 25

7-(D-2-Amino-2-phenylacetamido)-3-methoxymethyl-3-cephem-4-carboxylic acid

A solution of 185 mg. (0.74 mmole) of D-2-t-butoxy carboxamido-2-phenylacetic acid in 15 ml. of tetrahydrofuran (THF) was stirred and cooled to —5°. After adding 62 mg. (0.81 mmole) of triethylamine and 110 mg. (0.81 mmole) of isobutyl chloroformate, the reaction mixture was stirred for 20 minutes. To this resulting mixed anhydride solution was added a solution of 180 mg. (0.74 mmole) of 7-amino-3-methoxymethyl-3-cephem-4-carboxylic acid (7-AMCA), in 5 ml. of water, 5 ml. of THF and 0.103 ml. of triethylamine. After stirring the reaction mixture for one hour in an ice-bath and for two hours at room temperature, it was overlayered with ethyl acetate, cooled and the pH adjusted to 2.0 with 6 N HCl. The ethyl acetate layer was dried with MgSO₄ and evaporated to dryness. The residue was taken up in ethyl ether. After crystallization began, the flask was refrigerated for several days. The solid was then collected and vacuum dried, yielding 95.5 mg. of 7-(D-2-t-butoxycarboxamido-2 - phenylacetamide) - 3 - methoxymethyl - 3-cephem-4-carboxylic acid (t-BOC compound). A second crop was obtained by dilution of the filtrate above with a petroleum fraction (mostly hexane), B.P. 60–68° C. A cold (0°) solution of 150 mg. of the t-BOC compound in 2 ml. of trifluoroacetic acid was stirred for 5 minutes, then evaporated to dryness. The residue was taken up in 2 ml. of water. To this solution was added 25 percent "Amberlite LA–1" liquid anion exchange resin (acetate form) in methyl isobutyl ketone (MIRK) to pH 4.5. The aqueous layer was given a second treatment with the liquid anion exchange resin, then washed with MIBX. The aqueous layer was then evaporated to about 0.5 ml. and diluted with acetonitrile. The gel which precipitated from solution slowly crystallized. The solid was collected, washed with acetonitrile and vacuum dried, yielding 42.0 mg. of 7 - (D - 2'-amino-2'-phenylacetamido)-3-methoxymethyl-Δ³-cephem-4-carboxylic acid. The structure was confirmed by UV and NMR spectra and by microanalysis.

EXAMPLES 26 to 29

7-[D-2'-amino-2'-(3"-hydroxyphenyl)acetamido]-3-methoxymethyl-Δ³-cephem-4-carboxylic acid The acylation of 7-AMCA with D-2-t-butoxycarboxamido - 2 - (3-hydroxyphenyl)acetic acid was performed using the same mixed anhydride procedure as the preceding example. The removal of the t-BOC group and isolation of the 7-[D-2'-amino-2'(3"-hydroxyphenyl) acetamido] - 3 - methoxymethyl-Δ³-cephem-4-carboxylic acid as the zwitterion product was completed as follows: A solution of 513 mg. of the t-BOC protected compound was prepared in 6 ml. of cold (0°) trifluoroacetic acid. After 5 minutes, the excess trifluoroacetic acid was evaporated. The residue was dissolved in 2 ml. of water overlayered with 10 ml. of MIBK. The pH was adjusted to 5 by the addition of tributylamine. The aqueous layer was separated, washed with MIBK and evaporated to about 0.5 ml. The solution was diluted with 5 ml. of acetonitrile and refrigerated. After several hours, the solid was collected, washed with acetonitrile and vacuum dried at 50°, yielding 249.1 mg. of product. In the following table are listed phenylglycine derivatives prepared in the same manner as Example 26.

SUMMARY OF PHENYLGLYCINE DERIVATIVES

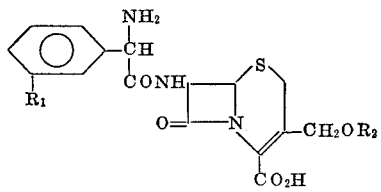

| | | | Microanalyses | | | | | | |
|---|---|---|---|---|---|---|---|---|---|
| | | | Calcd. | | | Found | | | |
| Example | $R_1$ | $R_2$ | C | H | N | C | H | N | λ ε |
| 26 | OH | $CH_3$ | 49.62 | 5.15 | 10.21 | 49.76 | 5.27 | 10.21 | 263 (7,400) |
| 27 | H | $CH_3$ | 54.11 | 5.08 | 11.14 | 54.28 | 5.20 | 11.27 | 258 (7,700) |
| 28 | Cl | $CH_3$ | 49.57 | 4.40 | 10.20 | 49.36 | 4.63 | 10.10 | 260 (7,400) |
| 29 | H | $-C_2H_5$ | 52.79 | 5.66 | 10.26 | 52.61 | 5.49 | 10.09 | 259 (7,500) |

EXAMPLE 30

A series of acylations were run as described in the following example: A solution of 11 mg. of 7-AMCA and 11 mg. of $NaHCO_3$ was prepared in 5.5 ml. of water. Aliquots (0.75 ml.) of this solution were stirred in an ice-bath and aliquots of acid chloride solutions of the indicated R group (containing 1.5 mg. of acid chloride) were added. After stirring for 30 minutes, the acetone was evaporated and each solution rediluted with $H_2O$ to 1.5 ml. These solutions were then tested against a broad spectrum of micro-organisms. It was also found that direct testing of the reaction solution without removal of acetone was possible. The compounds were also submitted for paper chromatography and bioautographs thereof.

The table below summarizes the antibiotic data obtained on the solutions, side chains used, and $R_f$ values obtained from the bioautographs.

An agar disc zone size of greater than 8 mm. is an indication of antibiotic activity of the test compound against the test organism in this qualitative test.

EXAMPLE 49

A suspension of 0.353 g. of 3-methyl-7-phenoxyacetamido-$\Delta^3$-cephem-4-carboxylic acid (prepared as described in U.S. Pat. No. 3,275,636) in 40 ml. of benzene is cooled in an ice bath and stirred while 0.256 g. of oxalyl chloride and 1 drop of dimethylformamide are added. The reaction mixture is stirred at about 5° C. for 45 minutes and the solvent removed under reduced pressure to yield the desired acid chloride of the starting $\Delta^3$-cephem acid.

EXAMPLE 50

A solution of 1.75 g. of the acid chloride of Example 49 in 70 ml. of methylene chloride is added dropwise to a stirred solution of 0.72 g. of triethylamine and 4.0 g. of 3-

ANTIBIOTIC ACTIVITY OF COMPOUNDS OBTAINED IN ACYLATIONS

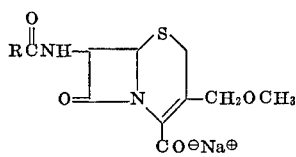

| R | $R_K$* | Agar disc test (zone size, mm.) | | | | | | | |
|---|---|---|---|---|---|---|---|---|---|
| | | G+SA | G+X12 | G+X186 | Tb X85 | G-X45 | G-X142 | G-X161 | G-X48 |
| Example Number: | | | | | | | | | |
| 30 ... $CH_2(CH_2)_5$ | 1.1 | 32 | 20 | 30 | | 11 | | | |
| 31 ... $CH_3(CH_2)_4-CH=CH-$ | 1.5 | 27 | 22 | 32 | | 12 | | | |
| 32 ... $ClCH_2\overset{Cl}{C}H-$ | 0.8 | 24 | 26 | 31 | | 14 | | | |
| 33 ... $CH_3CH_2\overset{Cl}{C}H$ | 0.9 | 29 | 28 | 35 | | 17 | | Tr. | |
| 34 ... $CH_3(CH_2)_7-\overset{Br}{C}H-$ | 2.2 | 30 | 29 | 45 | | 13 | | | |
| 35 ... $CH_3(CH_2)_3SCH_2-$ | 1.0 | 30 | 33 | 40 | | 14 | | 16 | |
| 36 ... $(CH_3)_2CH(CH_2)_2SCH_2-$ | 1.4 | 35 | 34 | 39 | | 16 | | 16 | |
| 37 ... $CH_2=CHCH_2SCH_2-$ | 0.9 | 25 | 21 | 29 | | 17 | Tr. | | |
| 38 ... $p-CH_3O-C_3H_4-CH_4-$ | 0.8 | 29 | 34 | 40 | | 16 | | 15 | |
| 39 ... $p-NO_2-C_3H_4-CH_2CH_2-$ | 1.0 | 32 | 20 | 37 | | 12 | | 11 | |
| 40 ... $m-Cl-C_3H_4-OCH_2-$ | 1.5 | 36 | 34 | 42 | | 15 | | 13 | |
| 41 ... $p-Cl-C_3H_4-OCH_2-$ | 1.1 | 40 | 35 | 37 | | 13 | | Tr. | |
| 42 ... $m-HO_2-C_3H_4-OCH_2-$ | 1.0 | 35 | 35 | 40 | | 12 | | 12 | |
| 43 ... $m-CH_3-C_3H_4-OCH_2-$ | 1.8 | 34 | 34 | 40 | | 12 | | Tr. | |
| 44 ... $C_6H_4-CH_2OCH_2-$ | 1.0 | 27 | 25 | 32 | | 14 | | | |
| 45 ... $p-F-C_2H_4-CH_2SCH_2-$ | 1.3 | 35 | 32 | 45 | Tr. | 15 | | 14 | |
| 46 ... $C_2H_5-CH_2CH_2SCH_2-$ | 1.4 | 29 | 34 | 40 | | 14 | | 16 | |
| 47 ... $C_6H_5(CH_2)_2SCH_2-$ | 1.7 | 31 | 34 | 37 | | 10 | | 13 | |
| 48 ... $C_6H_5-CH=CH-$ | 1.0 | 25 | 17 | 20 | | | | | |

*$R_K$ is defined as the ratio between the distance of the respective spot (bioautograph) from the origin and the distance between the spot made by the standard antibiotic, sodium cephalothin, and the origin. The $R_K$ ratios were determined from bioautograms of paper chromatographs of the test cephalosporin compound relative to the standard compound, which was Keflin (sodium cephalothin, Lilly), designated by "K" subscript, a commercially available cephalosporin antibiotic.

NOTE.—SA=*Staphylococcus aureus*; X12=*B. subtilis*; X186=*Sarcina* sp.; X85=*Sacharomyces pastorianum*; X45=*Proteus vulagris*; X142=*Salmonella gallinarum*; X161=*Escherichia coli*; X48=*Pseudomonas aeruginosa*.

methyl-1-buten-3-ol in 50 ml. of methylene chloride maintained at ice temperature. Upon completion of the addition (about 90 minutes), the organic solution is washed successively with water and 3 percent hydrochloric acid and evaporated to dryness. The residue is dissolved in ethyl acetate, washed with 5 percent sodium bicarbonate solution, and treated with activated charcoal. The mixture is filtered and the solvent is removed from the filtrate under reduced pressure to give 0.51 g. of 2-(2-methyl-3-butenyl) 3-methyl - 7 - phenoxyacetamido-$\Delta^2$-cephem-4-carboxylate. The structure is confirmed by the nuclear magnetic resonance spectrum. The neutral and basic washes yield 0.82 g. of a mixture of $\Delta^2$ and $\Delta^3$ acids.

EXAMPLE 51

A solution of 4.16 g. of the ester from Example 50 in one liter of carbon tetrachloride is stirred and purged with nitrogen for 20 minutes. To the solution are then added 2.67 g. of N-bromosuccinimide and 50 mg. of azobis-isobutyronitrile. The solution is stirred and heated under reflux until a negative starch-iodide paper test is obtained (approximately 4½ hours). The solution is cooled overnight in a refrigerator, the excess N-bromosuccinimide is removed by filtration through a cotton plug, and the carbon tetrachloride is evaporated to yield 2-(2-methyl-3-butenyl) 3 - bromomethyl-7-phenoxyacetamido-$\Delta^2$-cephem-4-carboxylate which is used in subsequent reactions.

EXAMPLE 52

A solution of about 4 millimoles of the 3-bromomethyl product from Example 51 in 25 g. of methyl mercaptan is stirred in a pressure bottle at 25° C. for one hour. The excess methyl mercaptan is allowed to evaporate and the residue is dissolved in methylene chloride. The methylene chloride is washed with 5 percent sodium bicarbonate solution and water, dried over sodium sulfate, and evaporated to dryness to give 1.4 g. of crude product. This crude product is chromatographed over 100 g. of silica gel containing 15 percent water using 6–8 percent ethyl acetate in benzene as solvent. In this manner there is obtained 100 mg. of pure 2-(2-methyl-3-butenyl) 3-methylthiomethyl - 7 - phenoxyacetamido-$\Delta^2$-cephem - 4 - carboxylate. The structure is confirmed by the nuclear magnetic resonance spectrum.

EXAMPLE 53

The $\Delta^2$ product from Example 52 is dissolved in 8 ml. of isopropanol, 2 ml. of triethylamine is added, and the mixture is stirred at 25° C. for one hour. The solvents are removed under reduced pressure. A nuclear magnetic resonance spectrum confirms that isomerization to the $\Delta^3$ compound has occurred.

EXAMPLE 54

A mixture of 750 mg. of 2-(2-methyl-3-butenyl) 3-methylthiomethyl - 7 - phenoxyacetamido - $\Delta^3$ - cephem-4-carboxylate from Example 53, 580 mg. of phosphorous pentachloride, and 221 mg. of pyridine in 75 ml. of dry benzene is stirred at 55° C. After three hours the reaction mixture is evaporated, the residue is dissolved in 100 ml. of methanol, and the solution is refrigerated overnight. The methanol is evaporated and the residue is dissolved in a chilled mixture of 50 ml. of tetrahydrofuran and 50 ml. of a pH 4.5 citrate buffer. After 35 minutes the tetrahydrofuran is evaporated. The aqueous solution is overlayered with ethyl acetate and the pH is adjusted to 7.0 by the addition of a solution of dibasic sodium orthophosphate. The ethyl acetate solution is washed with saturated salt solution, dried over magnesium sulfate, and the ethyl acetate evaporated. The crude 2-(2-methyl-3-butenyl) 3-methylthiomethyl-7-amino-$\Delta^3$-cephem - 4 - carboxylate is redissolved in 20 ml. of ethyl acetate and a solution of p-toluenesulfonic acid in ethyl acetate is added until the resulting solution is shown to be acidic on pH paper. After cooling for 30 minutes in an ice bath, the crystalline precipitate is collected, washed with ethyl acetate, and dried in a vacuum oven at room temperature yielding 370 mg. of 2-(2-methyl-3-butenyl) 3 - methylthiomethyl-7-amino-$\Delta^3$-cephem - 4 - carboxylate as the p-toluenesulfonic acid salt. The structure is confirmed by the nuclear magnetic resonance spectrum and elemental analysis.

EXAMPLE 55

A solution of 412.7 mg. of the product from Example 54 in 5 ml. of formic acid is allowed to stand at room temperature for two hours. The reaction mixture is evaporated to dryness and the oily residue is taken up in a mixture of 10 ml. of ethyl acetate and 6 ml. of water. While cooling, the pH of this mixture is adjusted to 8.5 with dilute ammonia solution. The aqueous layer is separated and the pH is adjusted to 3.8 with 6 N hydrochloric acid. After cooling for two hours, the white crystalline precipitate that has separated is collected and dried in a vacuum oven at 35° C., yielding 166.3 mg. of 3-methylthiomethyl-7-amino-$\Delta^3$-cephem - 4 - carboxylic acid. The structure is confirmed by the nuclear magnetic resonance spectrum and elemental analysis.

*Analysis.*—Calculated for $C_9H_{12}N_2O_3S_2$ (percent): C, 41.54; H, 4.65; N, 10.77. Found (percent): C, 41.70; H, 4.90; N, 10.52.

EXAMPLE 56

A solution of 160 mg. of N-(t-butoxycarbonyl)phenylglycine in 25 ml. of tetrahydrofuran is cooled to −5° C. and 65 mg. of triethylamine and 87 mg. of isobutyl chloroformate are added. To this cold solution is added a solution of 150 mg. of the product from Example 7 and 0.08 ml. of triethylamine in 5 ml. of water and 2 ml. of tetrahydrofuran. This mixture is stirred for three hours while being allowed to warm to room temperature. The tetrahydrofuran is then removed on a rotary evaporator. The remaining mixture is dissolved in water, overlayered with ethyl acetate, cooled in an ice bath, and the pH adjusted to 2.0 by the addition of 6 N hydrochloric acid. The ethyl acetate layer is separated, washed with saturated sodium chloride solution, dried over magnesium sulfate, and evaporated to leave a gummy residue. This residue is dissolved in diethyl ether and a petroleum fraction boiling at 60° to 68° C. is added to precipitate 167.3 mg. of 3-methylthiomethyl - 7 - ($\alpha$-t-butoxycarboxamido-$\alpha$-phenyl)acetamido-$\Delta^3$-cephem-4-carboxylic acid. This N-blocked material is dissolved in 3 ml. of cold trifluoroacetic acid. After stirring for five minutes, the solution is evaporated and the residue is taken up in 5 ml. of water and 5 ml. of methyl isobutyl ketone. After adjusting the pH to 4.5 with tributylamine, the water layer is separated and concentrated to about 0.5 ml. This solution is diluted with about 15 ml. of acetonitrile and refrigerated overnight. The solid is collected, washed with acetonitrile, and dried in vacuo yielding 64.6 mg. of 3-methylthiomethyl-7-($\alpha$-amino-$\alpha$-phenyl)acetamido-$\Delta^3$-cephem-4-carboxylic acid.

Following the procedure of Example 56 using thienylglycine or the appropriately substituted phenylglycine the following compounds are prepared:

3-methylthiomethyl-7-[$\alpha$-amino-$\alpha$-(m-chlorophenyl)acetamido]-$\Delta^3$-cephem-4-carboxylic acid;

3-methylthiomethyl-7-[$\alpha$-amino-$\alpha$-(p-methoxyphenyl)acetamido]-$\Delta^3$-cephem-4-carboxylic acid;

3-methylthiomethyl-7-[$\alpha$-amino-$\alpha$-(o-butylphenyl)acetamido]-$\Delta^3$-cephem-4-carboxylic acid;

3-methylthiomethyl-7-[$\alpha$-amino-$\alpha$-(p-nitrophenyl)acetamido]-$\Delta^3$-cephem-4-carboxylic acid;

3-methylthiomethyl-7-[$\alpha$-amino-$\alpha$-(p-cyanophenyl)acetamido]-$\Delta^3$-cephem-4-carboxylic acid; and 3-methylthiomethyl-7-($\alpha$-amino-$\alpha$-thienyl)acetamido-$\Delta^3$-cephem-4-carboxylic acid.

We claim:
1. Compounds of the formula

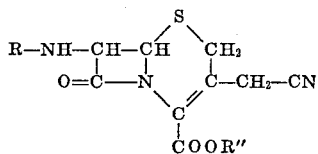

wherein R is hydrogen,

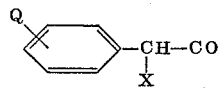

where X is amino, $NH_3^{\oplus}$, a protected amino, cyano, $C_1$ to $C_3$-alkyloxy, carboxyl, or $C_1$ to $C_3$-alkanoyloxy,

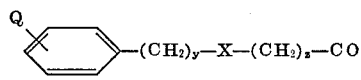

where X is oxygen or sulfur or a chemical bond, $y$ is an integer of from 0 to 2, and $z$ is an integer of from 1 to 3, and Q in each of the above phenyl rings is hydrogen, $C_1$ to $C_3$-alkyloxy, hydroxy, chloro, bromo, fluoro, carboxymethyl

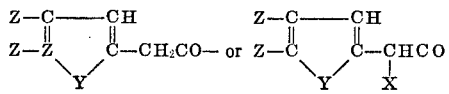

where Y is sulfur or oxygen, and each Z separately denotes hydrogen, or taken together with the carbons to which they are bonded, complete a benzo- ring, and X is as defined above, 2-sydnone-3-$C_1$ to $C_3$-alikanoyl-
$C_1$ to $C_{10}$-alkanoyl,
$C_2$ to $C_{10}$-haloalkanoyl where halogen is fluorine, chlorine, or bromine, or
$C_2$ to $C_{10}$-cyanoalkanoyl and R" is selected from the group consisting of
hydrogen,
a switterionic negative charge, a salt with pharmaceutically acceptable cation, and
$C_4$ to $C_6$-tert-alkyl,
benzyl,
methoxybenzyl,
nitrobenzyl,
benzhydryl,
trimethylsilyl, and
phenacyl ester groups.

2. A compound as defined in claim 1 wherein R is hydrogen, R' is cyano, and R" is a $C_4$ to $C_6$-tert-alkyl, or a $C_6$ to $C_{12}$-aromatic hydrocarbon sulfonic acid salt thereof.

3. A compound as defined in claim 2 wherein the compound is tert-butyl 7-amino-3-cyanomethyl-$\Delta^3$-cephem-4-carboxylate or a p-toluenesulfonate salt thereof.

4. A compound as defined in claim 1 wherein R is

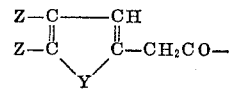

wherein Y is sulfur or oxygen and each Z is hydrogen; R' is cyano, R" is a $C_4$ to $C_6$-tert-alkyl.

5. A compound as defined in claim 4 wherein the compound is tert-butyl-7-(2'-thienylacetamido)-3-cyanomethyl-$\Delta^3$-cephem-4-carboxylate.

6. A compound as defined in claim 1 wherein R is

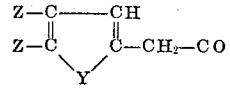

wherein each Y is oxygen or sulfur, and each Z is hydrogen; R' is cyano; and R" is hydrogen, or a salt with a pharmaceutically acceptable cation.

7. A compound as defined in claim 6 wherein the compound is 7-(2'-thienyl)acetamido-3-cyanomethyl-$\Delta^3$-cephem-4-carboxylic acid.

References Cited
UNITED STATES PATENTS 3,479,350   11/1969   Eardley et al. ____ 260—243 C NICHOLAS S. RIZZO, Primary Examiner U.S. Cl. X.R.

424—246